Oct. 10, 1967  J. D. SUTHERLAND, JR  3,346,518
METHOD OF PREPARING IMPROVED LATEX AND RUBBER
ARTICLES, AND THE PRODUCTS THUS PREPARED
Filed Jan. 6, 1964  2 Sheets-Sheet 2
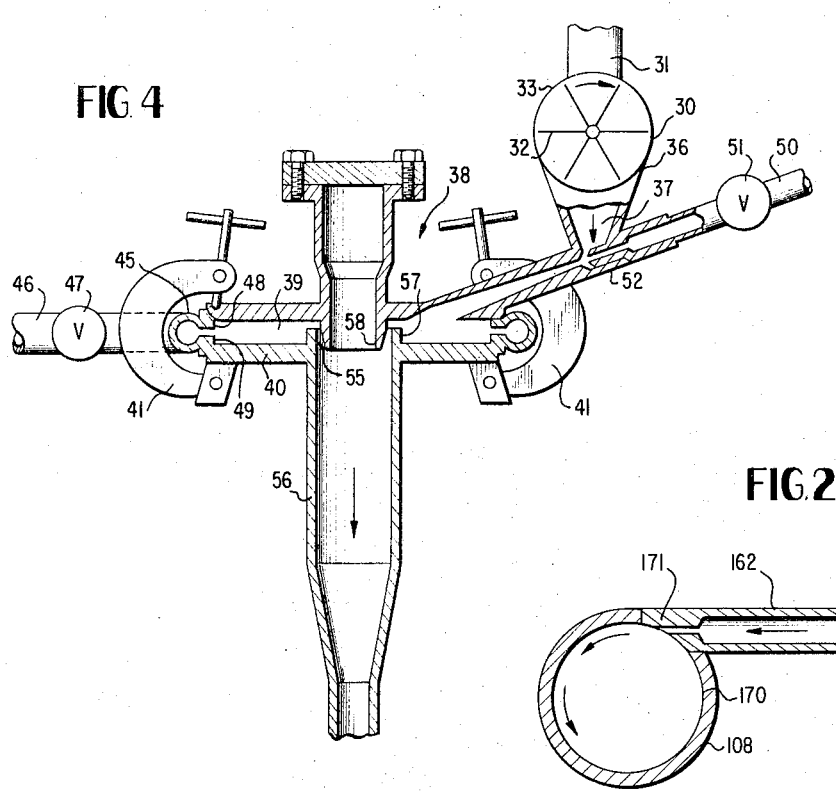
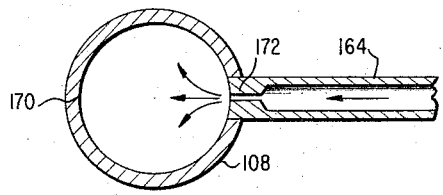
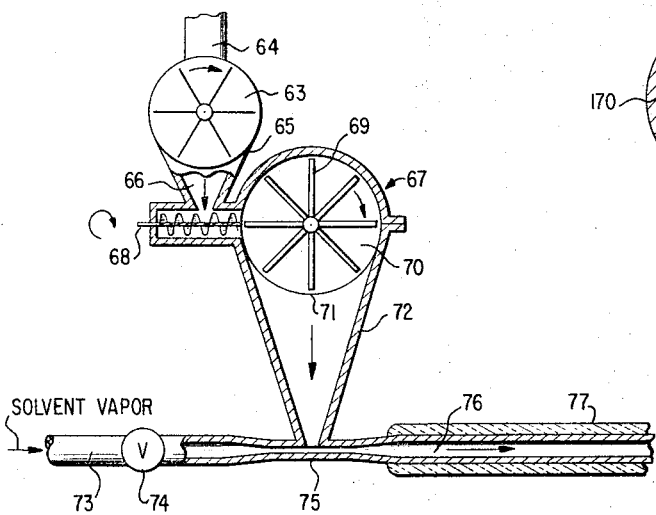
INVENTOR
JOHN D. SUTHERLAND, JR.
BY
ATTORNEY 3,346,518
METHOD OF PREPARING IMPROVED LATEX
AND RUBBER ARTICLES, AND THE PROD-
UCTS THUS PREPARED
John D. Sutherland, Jr., Baton Rouge, La., assignor to
Copolymer Rubber & Chemical Corporation, a corporation of Louisiana
Filed Jan. 6, 1964, Ser. No. 335,887
14 Claims. (Cl. 260—2.5)

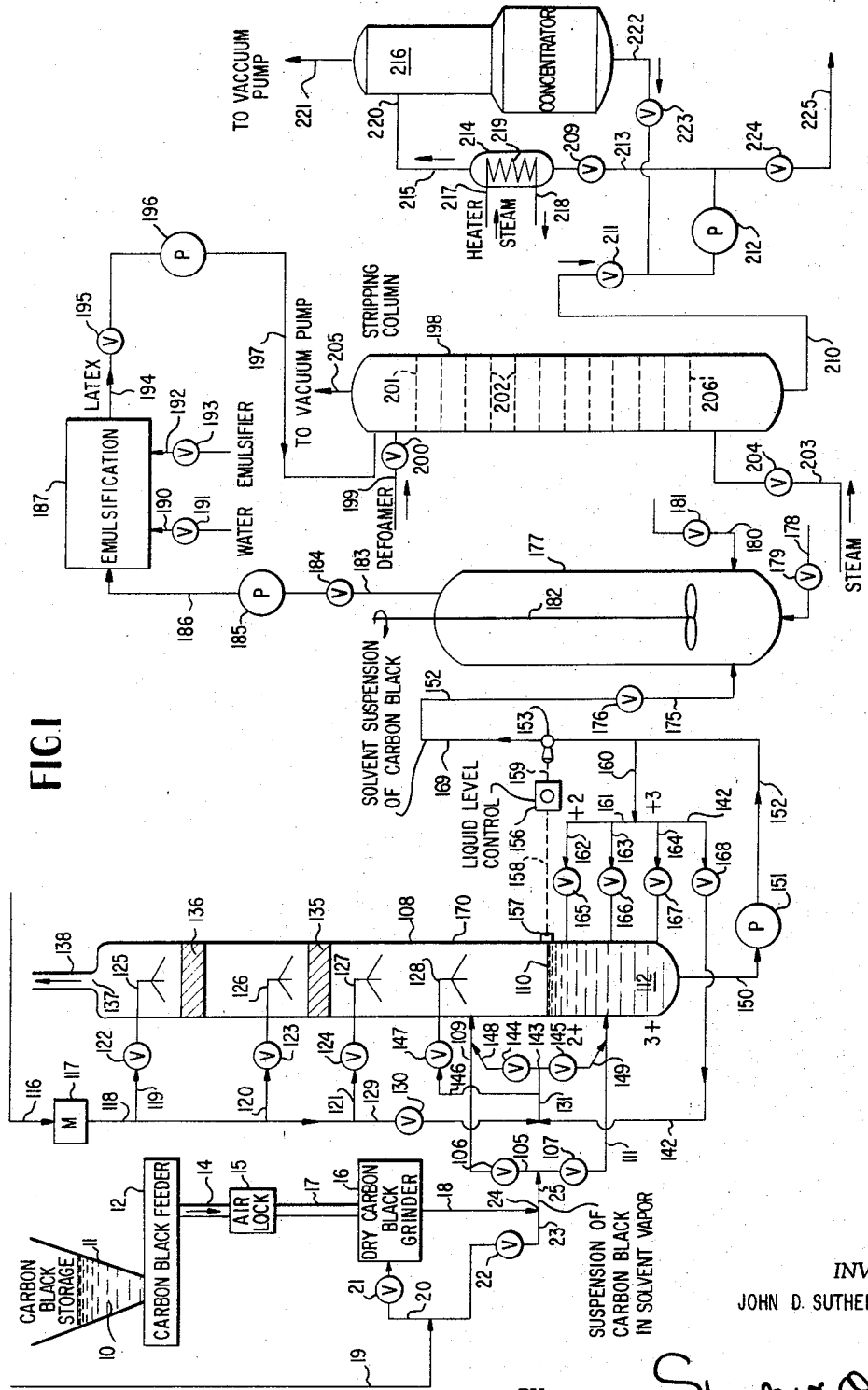

ABSTRACT OF THE DISCLOSURE

This invention relates to a method of preparing a rubber latex containing a reinforcing agent, such as carbon black, comprising mixing an organic solvent dispersion of carbon black with an organic solvent solution of a rubbery polymer, adding to said mixture water and a dispersing agent and subsequently evaporating the organic solvent from said mixture.

---

This invention relates to a novel method of preparing latex and rubber film and foamed articles therefrom. In some of its more specific aspects, the invention relates to the preparation of rubbery polymer latex containing a reinforcing agent, and to the use of the latex in the preparation of reinforced rubber film and foamed rubber articles. The invention further relates to the improved rubbery polymer latex and reinforced rubber film and foamed rubber articles prepared in accordance with the invention.

It has long been known that incorporation of colloidal carbon with solid rubbery polymers imparts desirable properties in the ultimate product such as increased modulus, tensile strength and abrasion resistance. While carbon black is widely used as a reinforcing agent for rubbery polymers and is very satisfactory for this purpose when properly incorporated therewith, the prior art methods available heretofore for incorporating carbon black with latex that is to be used in preparing rubber film and foamed rubber articles have left much to be desired.

Carbon black is commercially available in the form of pellets which are loose agglomerates of very small or colloidal particles of carbon. This form of carbon black is commonly referred to as "pelletized" carbon black and the loose agglomerates of carbon black or "pellets" must be ground to a much more finely divided state in order for it to have a maximum degree of effectiveness as a reinforcing agent.

One method widely used for incorporating carbon black with rubbery polymers involves vigorous milling of dry pelletized carbon black into the solid rubbery polymer to be reinforced therewith. The labor and power requirements are excessive and it is very difficult to obtain a uniform dispersion of sufficiently finely divided particles of carbon black. This tends to deleteriously affect the physical properties of the ultimate product as for best results it is essential that the carbon black be uniformly dispersed in finely divided form throughout the solid rubbery polymer. In addition, the working conditions are very undesirable as the light, dry particles of carbon black are difficult to restrict to the work area.

As a result of the disadvantages of milling dry carbon black into solid rubbery polymers, still other methods have been proposed. A further method includes mixing an aqueous suspension of carbon black with rubbery polymer in the form of latex. While this method is satisfactory when the mixture of latex and aqueous suspension of carbon black is coagulated to produce a solid rubbery polymer having carbon black dispersed throughout the particles of coagulum, it is not satisfactory for the preparation of latex suitable for preparing foamed rubber articles.

When an aqueous carbon black suspension is mixed with latex as described above, the carbon black in the resulting mixture is not uniformly dispersed throughout the polymer particles in the dispersed phase. Rather, the particles of carbon black are believed to be separated from the dispersed polymer particles by the film of emulsifier which surrounds the individual polymer particles and no true reinforcing effect is possible until the film of emulsifier is destroyed during coagulation of the latex. If rubber film is foamed rubber articles are prepared from the latex, the carbon black acts as a filler and there is no reinforcing effect. In fact, the resulting carbon black-containing rubber film and foamed rubber articles have less desirable physical properties than when the carbon black is absent.

It is an object of the present invention to provide a novel method of preparing latex containing a reinforcing agent and the resulting improved latex.

It is a further object to provide a novel method of comminuting pelletized carbon black and using the same in the preparation of latex in which the dispersed polymer particles are reinforced by the comminuted carbon black, and to provide the resulting improved latex.

It is still a further object to provide a novel method of preparing high solids latex suitable for use in the manufacture of rubber film and foamed rubber articles which contain a reinforcing agent, and to provide the resulting improved high solids latex.

It is still a further object to provide a novel method of preparing reinforced rubber film and foamed rubber articles from the latex of the invention, and to provide the reinforced rubber film and foamed rubber articles thus prepared.

Still other objects of the invention and the attendant advantages thereof will be apparent to those skilled in the art upon reference to the following detailed description and the drawings, wherein:

FIGURE 1 is a presently preferred arrangement of apparatus for preparing latex in accordance with the invention;

FIGURE 2 is a diagrammatic cross-sectional view taken through the quenching tower along the line 2—2 of FIGURE 1;

FIGURE 3 is a diagrammatic cross-sectional view taken through the quenching tower along the line 3—3 of FIGURE 1;

FIGURE 4 is a diagrammatic cross-sectional view of a fluid energy pulverizer suitable for dry grinding pelletized carbon black; and FIGURE 5 is a diagrammatic cross-sectional view of a mechanical pulverizer for grinding dry pelletized carbon black.

Referring now to FIGURE 1 of the drawings, dry pelletized carbon black 10 in storage bin 11 may be metered and fed at a constant predetermined controlled rate by means of carbon black feeder 12 via chute 14 to air lock 15. The carbon black feeder 12 may be a continuous loss in weight type feeder such as an "Omega feeder" or any suitable gravimetric feeder designed to deliver a constant carefully controlled output of carbon black. The air lock 15 may be a roto-lock valve or a star feeder, and is designed to prevent the direct pulling of air into the carbon black grinder to be described hereinafter, although a small amount of air in the light, dry, voluminous pellets of carbon black may be present in the feed.

The metered dry pelletized carbon black may be continuously passed at a predetermined controlled rate to dry carbon black grinder 16 via chute 17 where the loosely agglomerated particles of carbon are ground to a desired finely comminuted form. The grinder 16 may be of a suitable prior art design and construction, as will be explained more fully hereinafter. Grinders of the type commonly referred to in the art as fluid energy pulverizers for dry pelletized carbon black give excellent results. A vortex mixer or grinder such as disclosed in United States Patent 2,957,495 to C. L. Ashbrook also may be used. The carbon black may be suspended in superheated solvent vapor during the dry grinding operation, or the resulting comminuted carbon black may be withdrawn from the grinder 16 via conduit 18 and then suspended in superheated solvent vapor. For example, superheated solvent vapor may be fed to grinder 16 via conduit 19 and conduit 20 including open control valve 21, with control valve 22 in conduit 23 being closed, and the carbon black suspended in solvent vapor during the grinding operation; or the dry comminuted carbon black may be withdrawn from grinder 16 via conduit 18 and suspended in solvent vapor supplied via conduits 19 and 23 including open control valve 22, with control valve 21 in conduit 20 being closed. The point where the conduits 18 and 23 join may be constructed in the form of a venturi passage 24 to insure continuous removal of comminuted carbon black from carbon black grinder 16 via conduit 18 and suspension of comminuted carbon black in superheated solvent vapor. A suspension of comminuted carbon black in a gaseous medium including solvent vapor continuously flows through conduit 25 at substantially the rate the pelletized carbon black is being ground in grinder 16, which in turn is dependent upon the predetermined controlled rate at which the dry pelletized carbon black is fed to grinder 16.

Referring now to FIGURE 4 of the drawings, which illustrates a dry carbon black grinder in the form of a fluid energy pulverizer wherein superheated solvent vapor under pressure is used for injection of the pelletized carbon black and also as the fluid providing energy for the grinding operation, metered dry pelletized carbon black from a feeder such as carbon black feeder 12 is passed to roto-lock valve 30 via chute 31. The roto-lock valve 30 is a prior art type of air lock readily available and includes rotating segments 32 in sealing engagement with cylinder 33. As the segments 32 rotate in the direction of arrow, the segment on top communicating with chute 31 is filled with carbon black while the segments on the sides are in sealing engagement with cylinder 32 thereby preventing the direct pulling in of air through roto-lock valve 30. When the filled segment reaches the bottom, the carbon black contents are poured into feed funnel 36 thereby forming a body of pelletized carbon black at 37.

The fluid energy pulverizer generally designated as 38 may be the type described under "Jet Pulverizers" in Perry's Chemical Engineering Handbook, the type disclosed in U.S. Patent 2,590,220, or other prior art types suitable for grinding pelletized carbon black or other loosely agglomerated particles of carbon.

The pulverizer 38 includes a chamber 39 formed by a pair of spaced circular plates 40 which are clamped together by clamping means 41. High pressure superheated solvent vapor is fed to a header 45 via conduit 46 at a rate controlled by valve 47 and then into chamber 39 through tangential jets or orifices 48 formed in wall 49. Pelletized carbon black 37 in feed funnel 36 is fed into chamber 39 by means of superheated solvent vapor under pressure which is flowing through conduit 50 at a rate controlled by valve 51. The conduit 50 is provided with a venturi passage 52 which assures proper withdrawal of carbon black 37 from feed funnel 36 and its suspension in solvent vapor. An outlet 55 is provided in the vicinity of the center of chamber 39 which leads into conduit 56. A dam 57 is provided on the bottom of chamber 39 immediately adjacent the outlet 55 and with a hollow annular member 58 of a diameter somewhat smaller than the conduit 56 being inserted thereinto thereby reducing the cross-sectional area providing for communication between conduit 56 and chamber 39.

The superheated solvent vapor fed through conduits 46 and 50 may be at any suitable pressure such as about 20–200 p.s.i.g., but in most instances preferably about 50 p.s.i.g. in conduit 46 and 125 p.s.i.g. in conduit 50. There is a pressure drop in chamber 39, which may be approximately 5–15 p.s.i.g. or higher in some instances. The pelletized carbon black 37 may be fed into the fluid energy pulverizer 38 at a feed rate of about 1–80 pounds per minute, but preferably about 30 pounds per minute in most instances. Also, it is desired to have a ratio by weight between the feed rates of solvent vapor and carbon black of approximately 0.5:1 and 12:1, but usually preferably about 1:1, depending somewhat upon the rate of pelletized carbon black feed and the desired particle size in the comminuted carbon black. It is essential that the solvent vapor not be allowed to condense while within the fluid energy pulverizer 38 and apparatus associated therewith to a sufficient extent to cause the carbon black to become moist and ball up or otherwise plug the apparatus. Condensation may be readily prevented by supplying superheated solvent vapor in most instances. However, since it is only essential to prevent condensation of sufficient solvent vapor within the apparatus to cause plugging due to wetting of the carbon black, it may be possible in some instances to use saturated solvent vapor. It also may be possible to provide heating means for the apparatus to prevent condensation of solvent vapor or to remove liquid solvent entering with saturated solvent vapor.

High pressure superheated solvent vapor may be injected into fluid energy pulverizer 38 to grind the pelletized carbon black by centrifugal action in the circular chamber 38 and the carbon black is suspended in solvent vapor at the same time. In operating the fluid energy pulverizer 38, dry pelletized carbon black 37 is withdrawn from feed funnel 36 by means of solvent vapor passing through venturi passage 52 in conduit 50 and the resulting suspension passed into chamber 39 at high velocity. Then the high pressure superheated solvent vapor fed into chamber 39 via tangential steam jets 48 imparts an extremely rapid, swirling motion to the carbon black pellets. As a result of the collision of the carbon black particles with one another and the surfaces of the chamber 39, the carbon black pellets are ground to as fine a particle size as may be desired. The finely ground material overflows dam 57 and escapes through outlet 55 into conduit 56 in the form of a gaseous suspension of comminuted carbon black. The preferred particles size in the comminuted carbon black will vary depending upon the nature of the desired reinforced rubbery polymer product, but when used as a reinforcing agent rather than a filler not more than about 2% of the carbon black particles should be retained on a 325 mesh screen. However, much smaller particle sizes may be present since the smaller the particle size, the better the results when used as a reinforcing agent.

The pelletized carbon black feed may be of a type commonly employed in the rubber industry and the pellets are usually of a size which will pass a 12 mesh screen. However, the term "pelletized carbon black" is broadly used in the specification and claims and intended to include carbon black which is termed pelletized in this industry, as well as other loosely agglomerated particles of carbon black regardless of their prior processing.

Referring now to FIGURE 5, metered dry pelletized carbon black from carbon black feeder such as 12 illustrated in FIGURE 1 is passed to roto-lock valve 63 via chute 64 and deposited in feed funnel 65 as shown at 66. The roto-lock valve 63 is not essential since the screw feeder 68 may be designed and constructed so as to also perform the function of an air lock. However, when present as illustrated in FIGURE 5, the roto-lock valve 63 may be similar in construction and operation to the roto-lock valve 30 described above in connection with FIGURE 4. The carbon black is continuously fed to mechanical pulverizer 67 by means of screw feeder 68.

The mechanical pulverizer 67 is provided with a plurality of rapidly rotating hammers 69 which are driven in the direction of the arrows. The carbon black fed to chamber 70 is ground by rapidly rotating hammers 69 to a particle size sufficiently small to pass through classifying screen 71. The classifying screen 71 is selected so as to assure a sufficiently small particle size in the resulting comminuted carbon black. After passing through classifying screen 71, the comminuted carbon black falls into funnel 72. High pressure solvent vapor is fed via conduit 73 at a rate controlled by valve 74 to venturi passage 75 for the purpose of withdrawing comminuted carbon black from funnel 72 and suspending the same in solevnt vapor. Since a small amount of air is usually present in the carbon black feed passing through roto-lock valve 63, the gaseous suspension of carbon black will contain a major proportion of solvent vapor and a minor proportion of air. In this manner, a constant flow of comminuted carbon black suspended in a gaseous medium including solvent vapor flows through conduit 76 to a quenching step to be described hereinafter. The solvent vapor feed through conduit 73 may be superheated but saturated solvent vapor may be used in instances where there is insufficient condensation to cause plugging of the equipment with moist carbon black or where steps are taken to prevent condensation such as by heating all equipment carrying solvent vapor to an elevated temperature substantially above the boiling point of the solvent. Also, insulation 77 may be provided to reduce loss of heat and the amount of condensation.

The suspension of comminuted carbon black in a gaseous medium including solvent vapor, whether prepared by the methods of FIGURE 4 or 5, may be subsequently passed to a quenching step where a liquid solvent suspension thereof is prepared by condensing the solvent vapor with liquid solvent. Referring again to FIGURE 1, the gaseous suspension of carbon black flowing in conduit 25 is passed to header 105 and, depending upon the positions of control valves 106 and 107, it may be passed into quenching tower 108 via conduit 109 at a point above liquid level 110, or it may be passed via conduit 111 and introduced at a point below the liquid level 110 to obtain vigorous agitation of the collected body 112 of the liquid solvent suspension of carbon black in addition to quenching the solvent vapor. If desired, the control valves 106 and 107 each may be cracked and a first portion of the gaseous suspension of carbon black passed via conduit 109 and a second portion passed via conduit 111. This latter procedure will allow partial quenching of the gaseous suspension in the liquid solvent suspension of carbon black 112 with accompanying agitation and heating thereof and partial condensation in the space above liquid level 110 by intimate contact with sprayed liquid solvent, as will be explained more fully hereinafter.

The gaseous suspension of carbon black introduced above liquid level 110 via conduit 109, as well as any gaseous suspension introduced via conduit 111 and escaping upward through liquid solvent suspension 112, is quenched in the gaseous phase above liquid level 110 by means of sprayed liquid solvent. The liquid solvent may be introduced via conduit 116 and, after metering by meter 117, passed at a predetermined controlled rate via header 118 and conduits 119, 120 and 121 including control valves 122, 123 and 124, respectively, to spray devices 125, 126 and 127, respectively. The spray devices 125, 126 and 127, as well as spray devices 128 to be described more fully hereinafter, may be prior art spray devices of a type designed to produce a spray of finely divided liquid solvent, preferably in relatively finely divided form, which falls downwardly through quenching tower 108. For example, the spray devices may be of a type comprising a nozzle provided with a plurality of small openings through which liquid solvent under pressure is projected and subdivided into droplets, or they may be of the type which includes a rapidly rotating member to which liquid solvent is supplied and thrown outwardly by centrifugal force to thereby subdivide the liquid solvent into droplets. The header 118 is also in communication with conduit 129 including control valve 130 for the purpose of supplying fresh liquid solvent to conduit 131, as will be described more fully hereinafter.

As previously described, usually some gases that are not condensable upon contact with liquid solvent are present in the gaseous suspension of carbon black fed to quenching tower 108. These noncondensable gases, whether air or other noncondensable gases, are almost impossible to eliminate entirely. If the gaseous suspension of carbon black flowing in conduit 25 contains a substantial proportion of air and it is introduced via condut 111 beneath the liquid level 110, then the gases which are not condensed in the liquid solvent suspension of carbon black 112 tend to rise upwardly therein and form a froth on the surface which is very undesirable. Thus, in instances where a large amount of air is present, it is preferred that the gaseous suspension of carbon black be fed via conduit 109, introduced at a point above liquid level 110 and then quenched in the gaseous phase by means of sprayed liquid solvent. This procedure allows the noncondensable gases to escape upwardly through tower 108 without at any time being entrapped within a body of liquid solvent and yet the solvent vapor content of the gaseous suspension is readily condensed. Any air or other noncondensable gases passing upwardly through quenching tower 108 tend to carry some comminuted carbon black and for this reason a series of vertically arranged sprays is provided. Although the amount of carbon black lost from this source may be very small on a daily basis, nevertheless it is very undesirable since the surrounding area eventually is covered with a film of carbon black. While the economic loss of the carbon black is unimportant, the resulting unpleasant working conditions and the upkeep necessary over the entire plant area are prohibitive. In accordance with the present invention it is possible to substantially eliminate the loss of carbon black from quenching tower 108 by providing a plurality of vertically arranged spray devices 125, 126, 127 and 128 and demisters 135 and 136 which assure intimate contact between the upwardly rising uncondensed gases and the liquid solvent. The spray devices 125 and 126 are positioned above demisters 136 and 135, respectively, for the purpose of supplying liquid solvent to wet the demisters and wash carbon black therefrom downwardly through quenching tower 108. By the time the noncondensable gases reach outlet 137, they are washed substantially free of carbon black and are then passed to the atmosphere via outlet conduit 138.

While the gaseous suspension may be quenched by direct injection into a body of the liquid solvent, it is usually preferred that the condensation be by means of sprayed liquid solvent falling through the gaseous suspension. However, if desired, other methods of quenching may be used. For example, liquid solvent in the form of fresh liquid solvent and/or a dilute solution of polymer in liquid solvent may be supplied via conduits 116, 118 and 129, or a liquid solvent suspension of carbon black supplied via conduit 142, or mixtures thereof in any proportions, may be fed via conduit 131 to header 143 including control valves 144 and 145. Also, the liquid flowing in conduit 131 may be fed via conduit 146 to spray device 128 upon opening control valve 147 and closing control valves 144 and 145. Upon opening control valve 144 and closing control valves 145 and 147, the liquid flowing in conduit 131 may be passed via conduit 148 and injected or sprayed directly into the gaseous suspension of carbon black flowing in conduit 109 to condense or partially condense the solvent vapor content before discharging the remainder into quenching tower 108 at a point above liquid level 110. In such event, especially when gas-liquid contact means are provided within quenching tower 108 in the vicinity of the point of entry of conduit 109 and below, the air or other condensable gases entrapped in the liquid solvent will have a chance to pass upward in quenching tower 108. Similarly, upon closing control valves 144 and 147, the liquid flowing in conduit 131 may be passed via conduit 149 and injected or sprayed directly in conduit 111 to thereby condense or partially condense the solvent vapor content before it is passed to quenching tower 108.

The liquid solvent suspension of carbon black 112 collecting in the bottom of quenching tower 108 is withdrawn via conduit 150 and forced by means of pump 151 through conduit 152 including liquid level control valve 153. The liquid level control valve 153 is operated by liquid level controller 156 which is operatively connected in a conventional manner with level sensitive means 157 and liquid level control valve 153 by means of connections 158 and 159, respectively. The liquid level controller 156 operates valve 153 in response to changes in the height of liquid level 110 to thereby maintain the same within predetermined limits by bypassing a portion of the liquid solvent suspension of carbon black withdrawn by conduit 150 via conduits 152 and 160 to header 161. Header 161 is in communication with conduits 162, 163, 164 and 142 which include control valves 165, 166, 167 and 168, respectively, and lead back to quenching tower 108. Inasmuch as the liquid level 110 is maintained within predetermined limits by the above means, it will be apparent that the volume of liquid flowing in conduit 152 at point 169 will be at the rate the liquid solvent and solvent resulting from condensation of the solvent vapor are supplied to tower 108 and this volume of solvent will contain comminuted carbon black in an amount equal to the rate of feed to grinder 16. Also, the weight of carbon black flowing through conduit 152 at point 169 at any given time, in continuous operation, will be equal to the rate of feed of carbon black by carbon black feeder 12. Thus, a convenient means is provided for continuously supplying a given quantity of comminuted carbon block in the form of a liquid solvent suspension and the carbon black content may be controlled within very narrow limits. For example, a 1–10% by weight carbon black suspension may be prepared in quenching tower 108 by feeding thereto via conduit 118 20–200 gallons per minute of liquid solvent when the solvent vapor suspension of carbon black feed is within the limits mentioned hereinbefore.

The capacity of pump 151 may be such so as to provide for the pumping of the liquid solvent suspension of carbon black at a rate substantially higher than that flowing in conduit 152 at point 169, thereby assuring recycle via conduit 160 at a substantial rate. In this manner, it is possible to provide a feed of the liquid solvent suspension of carbon black in conduits 162, 163 and 164 for injection into the body of liquid solvent suspension 112 for purposes of agitation and/or in condut 142 for the purpose of quenching the gaseous suspension of carbon black. Recycling the liquid solvent carbon black suspension via conduit 142 assures that sufficient liquid solvent will always be present for quenching the solvent vapor with the necessity for fresh liquid solvent being held to a minimum. This arangement allows the concentration of the liquid solvent suspension to be increased to any desired practical level. Conduits 162, 163 and 164 may be constructed so as to assure a maximum amount of agitation within the liquid solvent suspension 112 and prevent carbon black from settling out. With reference to FIGURE 2 of the drawings, the conduit 162 is shown passing tangentially through wall 170 of quenching tower 108 and in such a manner as to impart a swirling motion to the body of liquid solvent suspension 112. Also, the conduit 162 may contain a restricted portion 171 to further increase this effect. Similarly, upon reference to FIGURE 3 of the drawings, the conduit 164 is shown passing perpendicularly through wall 170 of quenching tower 108 and in such a manner so as to insure agitation of the body of liquid solvent suspension 112 but not necessarily with a swirling motion. The conduit 164 may be provided with a restricted portion 172 which further increases this agitation effect. It will be apparent that any or all of the conduits 162, 163 and 164 may pass through wall 170 of quenching tower 108 tangentially as described in FIGURE 2 or perpendicularly as described in FIGURE 3.

The solvent suspension of carbon black flowing in conduit 152 may be passed to mixing vessel 177 via conduit 175 at a rate controlled by valve 176, and a rubbery polymer in the form of a volatile organic solvent solution may be fed to vessel 177 via conduit 178 at a rate controlled by valve 179. Any other desired ingredients may be added via conduit 180 at a rate controlled by valve 181, such as an organic solvent solution of BLE, which is said to be a high temperature reaction product of diphenylamine and acetone, or other antioxidant, rubbery polymer processing oil and/or a solution of a different polymer which provides a prior art polymer mixture having improved properties. The resulting ingredients are intimately admixed by means of agitator 182 and the admixture withdrawn via conduit 183 at a rate controlled by valve 184 and passed by pump 185 via conduit 186 to the prior art emulsification apparatus 187 which may be, for example, a Charlotte colloid mill or an ultrasonic emulsifier, such as, for example, of the type based on a rapidly vibrating reed. Water is fed to emulsification apparatus 187 via conduit 190 at a rate controlled by valve 191 and similarly, emulsifier or a solution thereof may be fed via conduit 192 at a rate controlled by valve 193.

The intimate admixture of comminuted carbon black suspension, solution of rubbery polymer, and any other ingredients fed via conduit 180 is emulsified within emulsification apparatus 187 to form the dispersed phase of the latex. Thus, the dispersed particles in the latex contain the ingredients of the admixture fed via conduit 186 and are dispersed in the water fed via conduit 190 as the continuous phase. The dispersed particles of the resulting latex contain volatile organic solvent and the latex may be fed via conduit 194 at a rate controlled by valve 195 to pump 196 which transfers it via conduit 197 to a prior art stripping column 198 which may be of the type used for stripping styrene from styrene-butadiene rubber latex. The construction and operation of the prior art stripping column 198 is well known. For example, a prior art defoamer may be fed to the top tray 201 of stripping column 198 via conduit 199 at a rate controlled by valve 200, and the latex likewise may be fed to the top tray 201. The latex passes downward in stripping column 198 over a series of perforated trays 202. Steam may be fed to the bottom of stripping column 198 via conduit 203 at a rate controlled by valve 204 and passes upward in stripping column 198 through the perforations in trays 202. The upper portion of stripping column 198 may be connected to a vacuum pump (not shown) via conduit 205. The volatile organic solvent or other volatile substances present in the dispersed particles of the latex is evaporated and removed in the gaseous mixture withdrawn via conduit 205. As a result, the latex withdrawn from the bottom of stripping column 198 via conduit 210 contains dispersed particles which may be substantially free of volatile organic solvent and contain the comminuted carbon black dispersed throughout the resulting polymer particles in such a manner as to result in reinforcement. The resulting latex may have a relatively low solids content such as about 2–30% and preferably about 5–15% by weight. Often a solids content of about 10% by weight gives best results. The latex flowing in conduit 210 is passed at a rate controlled by valve 211 to pump 212 which transfers it at a rate controlled by valve 209 via conduit 213, heater 214 and conduit 215 to the upper portion of concentrator 216. Steam may be supplied to heater 214 via conduit 217 in a quantity sufficient to result in heating of the latex flowing in conduit 213 to a desired temperature.

The concentrator 216 may be of a prior art type suitable for thermally concentrating low solids synthetic rubber latices to a high solids content. The concentrator 216 may be provided with a latex feed inlet at 220 in the upper portion and exhaust conduit 221 leading from the top to exhaust means such as a vacuum pump (not shown) and a conduit 222 provided with valve 223 for withdrawing the contents. When charging the concentrator 216, the valves 223 and 224 may be closed, valves 209 and 211 may be opened, and latex is withdrawn via conduit 210 and passed to pump 212 which transfers it through conduit 213, heater 214, conduit 215 and feed inlet 220 into the interior of concentrator 216. After introducing the desired quantity of latex, valve 211 may be closed, valve 223 may be opened, and the charge of latex continuously recycled through conduit 213, heater 214, conduit 215, concentrator 216, and conduit 222 by means of pump 212 until concentrated to a desired solids content. During the recycling step, a suitable heating fluid such as steam may be supplied to and withdrawn from coil 219 in heater 214 via conduits 217 and 218, respectively. The concentrator 216 may be maintained under a suitable reduced pressure such as 28 inches of mercury vacuum by suction on exhaust conduit 221 thus allowing a portion of the volatile contents which may be largely water to evaporate. The vapor may be withdrawn from the system via exhaust conduit 221 and when the latex is concentrated to a desired content, such as about 50–60% to 65–70% total solids content by weight, valve 209 may be closed, valve 224 opened, and the final latex product withdrawn via conduit 225. If desired, continuous operation may be effected by continuously passing a controlled quantity of latex to the concentrator 216 through conduit 210 and partially opened valve 211 and a high solids latex stream may be withdrawn continuously at a controlled rate via conduit 225 through partially opened valve 224.

The high solids latex withdrawn via conduit 225 may be used in the manufacture of reinforced film rubber and foamed rubber articles or for the preparation of other types of articles following prior art procedures. For example, foamed latex sponge rubber is usually prepared by the Dunlop process or the more modern process using an Oakes machine. In the Dunlop process high solids latex and various compounding ingredients are subjected to agitation in a mixer, such as a Hobart mixer when operating on a laboratory scale, to thereby generate latex foam. In the more modern process, feeds of latex, various compounding ingredients and air are metered into an internal mixer such as an Oakes machine, the ingredients agitated under pressure and the resulting latex foam withdrawn from the machine. Shortly before the agitation cycle is completed in the Dunlop process or immediately before withdrawing the latex foam from the Oakes machine, a delayed action gelling agent such as sodium silicofluoride is added. The resulting latex foam is poured into molds where it gels or coagulates into a solid mass after expiration of a period of time. The molds may be placed into a steam autoclave and the rubber cured, after which the molds may be opened, the cured sponge rubber articles removed therefrom, washed and dried.

In the manufacture of reinforced rubber gloves and other reinforced rubber film articles, a form may be dipped into a coagulating agent such as acid and is then dipped into the latex of the invention. A reinforced rubber film containing the carbon black or other reinforcing agent uniformly distributed therein deposits on the form and the steps in the process may be repeated until a reinforced film of a desired thickness is produced. The resulting rubber film article may be stripped from the form and further treated in accordance with prior art practice. The rubber film article may be in the form of a reinforced rubber sheet when desired.

While the above steps in the manufacture of rubber film and foamed rubber articles are usually employed, it is understood that still other processes are satisfactory. In most instances, the processing steps of the prior art need not be changed when uing the latex of the present invention and a given prior art process may be followed with the exception of substituting the latex of the present invention for that previously employed.

The rubber film and foamed rubber articles prepared in accordance with the present invention have improved physical properties such as higher tensile strengths and higher compression resistances. Thus, a true reinforcement of the rubber is obtained as distinguished from merely filling the rubber. When prior art latex containing carbon black is used to prepare a rubber film or foamed rubber article, the resulting article has lower physical properties than when the carbon black is omitted due to the carbon black acting as a filler and not as a reinforcing agent.

While carbon black has been illustrated herein as a specific example of a reinforcing agent, still other inorganic reinforcing agents for natural and synthetic rubber may be employed. Examples of other prior art reinforcing agents include silica, calcium silicate, titanium dioxide, zinc sulfide, magnesia, clay, etc. Preferably, the inorganic reinforcing agents are in an extermely finely divided condition.

Organic reinforcing agents for polymeric materials also may be used when this is desirable. Examples of organic reinforcing agents include coumarone-indene resins, polystyrene, high styrene resins, styrene-isobutylene resins, phenolaldehyde resins, lignin, etc. Piccopale resins, which are said to be thermoplastic, methylated paraffinic chain hydrocarbon resins of petroleum origin, also may be used as a reinforcing agent. In some instances a combination of one or more of the above mentioned inorganic reinforcing agents and/or one or more of the organic reinforcing agents may be used. Some combinations of inorganic reinforcing agents and organic reinforcing agents are especially effective such as coumarone-indene resins with an inorganic reinforcing agent such as carbon black.

The amount of the reinforcing agents to be employed in practicing the present invention often may be the same as when reinforcing solid rubbery polymers. About 2–25 parts by weight of inorganic reinforcing agent for each 100 parts by weight of polymer present in the latex may be used. Smaller quantities of inorganic reinforcing agent such as about 5–15 parts by weight may be desirable in some instances and often about 10 parts by weight for each 100 parts by weight of polymer is preferred. When a mixture of organic reinforcing agent and inorganic reinforcing agent is used, usually it is preferred that the organic reinforcing agent be present in an amount of about 2–25 parts by weight and preferably about 5–15 parts by weight for each 100 parts by weight of polymer, and the inorganic reinforcing agent may be present in quantities above mentioned in addition thereto. In instances where an organic reinforcing agent is soluble in an inert volatile organic solvent, it may be added as a solution to vessel 177 in the proper amount.

The dry comminuted carbon black also may be added directly to the solution of polymer flowing in conduit 178 when this is desired. For example, a mechanical carbon black pulveriper similar to that illustrated in FIGURE 5 may be used to comminute the carbon black, and a solution of polymer rather than solvent vapor may be passed via conduit 73 at a rate controlled by valve 74 to thereby withdraw the carbon black and form a suspension thereof in conduit 76. Still other methods may be used for mixing the ground carbon black with the solution of polymer, such as dropping the dry comminuted carbon black into a vessel containing the solution polymer and agitating the resulting mixture. It is also possible to prepare an aqueous carbon black slurry and vigorously agitate it with the solution of polymer. The carbon black content of the aqueous slurry is transferred to the organic phase to thereby produce a suspension of carbon black in the polymer solution and the aqueous phase is separated and discarded.

The pelletized carbon black may be any desired type of rubber grade carbon black including those disclosed on pages 400–401 of the text, "Synthetic Rubber," edited by G. S. Whitby, John Wiley and Sons, Inc., 1954. The pelletized carbon black is preferably dry ground in a fluid energy pulverizer, such as that illustrated in the drawings, to an extremely fine particle size which may closely approach the ultimate particle size thereof. The steps illustrated in the drawings of dry grinding the pelletized carbon black to the above mentioned fine particle size in a fluid energy pulverizer using solvent vapor as the grinding fluid to produce a suspension of the ground carbon black in solvent vapor, quenching the solvent vapor with liquid organic solvent in the absence of a dispersing agent to produce a carbon black suspension containing substantially the original ground carbon black particles and maintaining the individual particles of finely comminuted carbon black in liquid organic solvent suspension until it is mixed with the solution of polymer, followed by forming a mixture thereof with an organic solution of rubbery polymer and maintaining the carbon black in suspension in the resulting mixture in its finely comminuted form up to the time of emulsification and solvent removal, results in the individual particles of carbon black or other reinforcing agent being maintained in substantially their original finely comminuted condition and an extremely uniform, fine, dispersion thereof is produced in the resulting polymer particles of the latex. This assures optimum reinforcement of the polymer and results in improved physical properties in the foamed rubber articles prepared therefrom.

The emulsifying agent supplied via conduit 192 to emulsification apparatus 187 may be the same as the prior art emulsification agents used in the aqueous emulsion polymerization of butadiene and styrene or in preparing other types of latices. The water soluble long chain fatty acid soaps such as sodium or potassium oleate or stearate or the rosin soaps, or mixtures thereof, are especially useful. If desired, a secondary emulsifier also may be present such as the polymerized sodium salts of alkyl naphthalene sulfonic acid, or other synthetic detergents may be used. The amount of emulsifying agent to be used also may be in accordance with prior art practice as it is only necessary that sufficient emulsifier be present to produce a stable latex. Usually, a primary emulsifier such as a long chain fatty acid soap should be present in an amount of, for example, about 2–10 parts by weight and a secondary emulsifier in an amount of, for example, about 0.1–2 parts by weight for each 100 parts by weight of latex solids. However, it is understood that smaller or larger amounts of the emulsifier may be present as necessary to produce a stable latex.

The latex may be prepared at a suitable solids content by controlling the concentration of ingredients in the polymer solution to be emulsified and the amount of water and emulsifier supplied to emulsification apparatus 187. The latex may be prepared at a low solids content such as less than about 25% solids by weight as withdrawn from conduit 210, and then it may be concentrated to a high solids content in concentrator 216 such as 50–55% by weight solids or higher. In some instances, it may be desirable to prepare a high solids latex containing 60–65% by weight solids or higher. The solids content of the latex includes rubbery, polymer, reinforcing agent, soap, antioxidant and processing oil when present.

By proper selection of the ingredients and quantities of ingredients passed into vessel 177, it is possible to prepare a wide variety of latices of a single polymer or mixture of polymers, and with or without other ingredients such as rubbery polymer processing oil, antioxidants, organic reinforcing agents, etc. Rubbery polymer mixtures of natural and synthetic rubbers may be prepared by first dissolving the solid polymers in an inert volatile organic solvent, and then supplying the mixture to vessel 177 via conduits 178 and/or 180. The polymer solution may be the reaction product resulting from the polymerization of a monomer or a mixture of monomers following prior art solution polymerization techniques to produce a rubbery polymer or copolymer. Examples of suitable polymers include the rubbery homopolymers of conjugated diolefins or polychloroprene, rubbery copolymers of conjugated diolefins and monoethylenically unsaturated monomers, natural rubber etc. Specific examples of polymers include natural rubber, styrenebutadiene rubber and polybutadiene or polyisoprene including the cis-1,4-steroisomers of polybutadiene and polyisoprene.

The polymer may be dissolved in an inert volatile organic solvent such as the water insoluble swelling agents or solvents for synthetic polymers that are well known to the art. Examples include normally liquid hydrocarbons and normally liquid halogenated hydrocarbons containing, for example, 5–14 carbon atoms and as low as 1–4 carbon atoms in instances where the hydrocarbon is halogenated, aromatic hydrocarbons and their derivatives such as benzene, toluene, xylene, and especially aromatic solvents containing 6–10 carbon atoms and a single benzene nucleus, turpentine, chloroform, carbon tetrachloride, chlorobenzene, cyclohexane, etc. Examples of saturated hydrocarbon solvents which are especially useful contain 5–10 carbon atoms such as hexane, heptane, octane and nonane. Mixtures of one or more of the above substances may be used. The term "inert" when referring to the solvent is understood to mean that an adverse reaction does not occur under the conditions of use of the solvent.

It is preferred that the same solvent be used for the solvent vapor for grinding the carbon black, the liquid solvent for quenching the solvent vapor, and the solvent for preparing the feeds to vessel 177. This is especially true when a solution polymerization process is practiced in combination with the apparatus illustrated in FIGURE 1 of the drawings for the purpose of providing a polymer solution. In such instances, the same organic solvent may be used throughout the system, including the polymerization step, and the reactor product resulting from the solution polymerization may be fed directly to the vessel 177. The resulting unreacted monomer content and organic solvent may be withdrawn from stripping column 198 via conduit 205, fractionated and recycled to the polymerization step, the carbon black grinding step and/or the solvent vapor quenching step. Also, any unreacted monomer that is recovered may be recycled to the polymerization step.

In instances where a rubbery polymer processing oil is fed to vessel 177, it is usually preferred to use an aromatic or highly aromatic rubbery polymer processing oil or the naphthenic nonstaining oils. However, other suitable rubbery polymer processing oils may be used such as those disclosed in the text "Synthetic Rubber." The processing oil may be present in the latex in any suitable amount such as, for example, 1–25 parts by weight and preferably 5–15 parts by weight for each 100 parts by weight of rubbery polymer.

The dispersed phase in the latex products withdrawn via conduit 210 or 225 contains a mixture of the nonvolatile ingredients fed to vessel 177. For example, the particles in the dispersed phase may be rubbery polymer containing carbon black or other inorganic reinforcing agent distributed uniformly therethrough. The dispersed particles also may contain processing oil, antioxidant and/or organic reinforcing agent uniformly distributed therethrough when one or more of these substances are present. The dispersed particles may be encompassed or partially encompassed with a film of emulsifier which thereby aids in maintaining the stability of the system. The above described latex is to be distinguished from latex which contains several different types of particles in the dispersed phase with a film of emulsifier coating each different type of dispersed particle and thereby separating it from the remaining types. For example, use of a latex which contains only polymer particles coated with an emulsifier film and carbon black particles coated with an emulsifier film does not result in reinforcement of rubber articles prepared therefrom.

The foregoing detailed description, the drawings and the following specific examples are for purposes of illustration only and are not intended as being limiting to the spirit or scope of the appended claims.

*Example I*

Dry pelletized high abrasion furnace black is metered and fed to a fluid energy pulverizer such as illustrated in FIGURE 4 of the drawings at a rate of about 30 pounds per minute. Superheated benzene vapor at a temperature of about 150° C. is passed to the fluid energy pulverizer for the purpose of supplying the fluid energy necessary for feeding and grinding the carbon black. The benzene vapor used in the injector jet feeding the carbon black into the fluid energy pulverizer is at a pressure of 125 p.s.i.g., while benzene vapor tangentially supplied to the chamber is at a pressure of 50 p.s.i.g. The feed ratio by weight of benzene vapor to carbon black is about 1:1.

The resulting benzene vapor-comminuted carbon black suspension is withdrawn from the fluid energy pulverizer and fed to a quench tower of the type illustrated in FIGURE 1. In the quench tower, the suspension of comminuted carbon black in benzene vapor is converted into about a 6–7% by weight of carbon black suspension by means of spray nozzles feeding about 56 gallons per minute of cool liquid benzene having a temperature of about 25° C. The temperature of the resulting carbon black slurry is about 60–70° C.

The carbon black suspension collected in the bottom of the quench tower is withdrawn at the rate of its formation and transferred to a mixing vessel where it is mixed with a solution containing about 10% by weight of styrene-butadiene rubber in benzene. The resulting mixture of carbon black suspension and styrene-butadiene rubber solution contains about 10 parts by weight of carbon black for each 100 parts by weight of rubber and it is emulsified in a Charlotte colloid mill with water using potassium oleate as an emulsifying agent. The latex thus produced is passed to a stripping column of the type used in stripping styrene from styrene-butadiene rubber latex and the benzene content removed by steam distillation. The stripped latex withdrawn from the stripping column has a solids content of about 10% by weight and is concentrated to about 60% solids by weight in a prior art concentrator of the type used to concentrate low solids styrene-butadiene rubber latex.

The above prepared high solids latex (60% TSC) may be used in preparing foamed latex sponge rubber from a formulation containing the following ingredients for each 100 parts by weight of polymer contained in the latex:

| | Parts |
|---|---|
| Sulfur | 2.5 |
| Ethyl zimate | 1.1 |
| Zetax | 1 |
| Aluminum silicate | 1.5 |
| Zinc oxide | 4 |
| Sodium silicofluoride | 2.0 |
| Triamine base (an amine-type gell sensitizer) | 0.5 |
| Potassium oleate | 2.5 |

The above ingredients are ground in water with the emulsifier if solid, or placed in solution if soluble, and then admixed with the latex in a Hobart mixer to produce latex foam. The resulting latex foam is poured into a mold and after a lapse of time the foam gells and coagulates. The gelled foam is then placed into a steam autoclave and cured at 212° F. for approximately 30 minutes, then removed from the mold, washed, dried and tested for tensile strength and compression resistance.

Subsequent control runs under identical conditions with the exception of using latex to which comminuted carbon black is added as an aqueous carbon black suspension in the same amount, or by omitting the carbon black entirely, give comparative data. The sponge rubber article prepared from the latex of the invention exhibits markedly higher tensile strength (p.s.i.) and compression resistance (p.s.i.) than the articles prepared during the control runs. Thus, true reinforcement of the rubber is obtained. The articles prepared from latex which does not contain carbon black exhibit substantially lower tensile strength (p.s.i.) and compression resistance (p.s.i.), while articles prepared from the latex containing the aqueous carbon black suspension exhibit even lower tensile strength (p.s.i.) and compression resistance (p.s.i.). It is therefore apparent that the carbon black in the latter instance is acting as a filler rather than a reinforcing agent.

*Example II*

This example illustrates the preparation of reinforced rubber film articles from the high solids latex (60% TSC) prepared in accordance with Example I.

A rubber glove form is dipped into an acid solution and then into suitably compounded high solids latex of Example I. A uniform film of rubber containing carbon black coagulates on the glove form. The rubber film is increased in thickness by repeating the steps of first dipping the form into the acid solution and then into the latex until a desired film thickness for the glove is obtained. The glove is then cured, stripped from the form, washed, dried and tested.

Subsequent control runs in which gloves are prepared under identical conditions with the exception of using high solids latex to which comminuted carbon black is added in the same amount as in Example I as an aqueous carbon black suspension, or high solids latex containing no carbon black, give comparative data. The rubber film in the glove prepared from the latex of Example I exhibits markedly higher tensile and tear strength (p.s.i.) than the rubber films in the gloves prepared from the other two latices. Thus, true reinforcement of the rubber film is obtained. The rubber film of the glove prepared from latex containing aqueous carbon black suspension exhibits a substantially lower tensile strength and tear strength (p.s.i.) than the rubber film of the glove prepared from latex containing no carbon black. It is therefore apparent that the carbon black in the later instance is acting as a filler rather than a reinforcing agent.

What is claimed is:

1. A method of preparing latex comprising passing pelletized carbon black into a fluid energy pulverizer for grinding pelletized carbon black, passing vapor of a volatile inert organic solvent which is under pressure into the fluid energy pulverizer as a grinding fluid, dry grinding the pelletized carbon black in the fluid energy pulverizer by means of the vapor of the organic solvent as the grinding fluid to produce comminuted carbon black, withdrawing vapor of the organic solvent containing suspended comminuted carbon black from the fluid energy pulverizer, intimately contacting the withdrawn solvent vapor suspension of comminuted carbon black with liquid volatile inert organic solvent to condense the solvent vapor and produce a suspension of comminuted carbon black in the liquid organic solvent, intimately admixing the suspension of carbon black with a solution of polymer dissolved in a volatile inert organic solvent, emulsifying the intimate admixture containing the suspension of carbon black and the solution of polymer in water in the presence of an emulsifying agent to produce latex of the polymer, the particles in the dispersed phase of the latex containing the intimate admixture of the suspension of carbon black and the polymer solution, and evaporating organic solvent from the latex to produce particles in the dispersed phase containing carbon black dispersed in the polymer.

2. The method of claim 1 wherein the latex is prepared at a low solids content not exceeding about 35% by weight and the resulting low solids latex is concentrated to a high solids content of at least 50% by weight.

3. The method of claim 1 wherein the polymer is selected from the group consisting of natural rubber, polychloroprene, rubbery homopolymers of conjugated diolefins, rubbery copolymers of conjugated diolefins and monoethylenically unsaturated monomers, and mixtures thereof.

4. The method of claim 1 wherein the polymer is a rubbery copolymer of styrene and butadiene.

5. The latex prepared by the method of claim 1.

6. In a method of preparing a foamed rubber article wherein a composition including latex of a rubbery polymer is foamed and the foam is formed into a desired article, gelled and cured, the improvement comprising foaming a composition including latex prepared by a method including passing pelletized carbon black into a fluid energy pulverizer for grinding pelletized carbon black, passing vapor of a volatile inert organic solvent which is under pressure into the fluid energy pulverizer as a grinding fluid, dry grinding the pelletized carbon black in the fluid energy pulverizer by means of the vapor of the organic solvent as the grinding fluid to produce comminuted carbon black, withdrawing vapor of the organic solvent containing suspended comminuted carbon black from the fluid energy pulverizer, intimately contacting the withdrawn solvent vapor suspension of comminuted carbon black with liquid volatile inert organic solvent to condense the solvent vapor and produce a suspension of comminuted carbon black in the liquid organic solvent, intimately admixing the suspension of carbon black with a solution of rubbery polymer dissolved in a volatile inert organic solvent, emulsifying the intimate admixture containing the suspension of carbon black and the solution of rubbery polymer in water in the presence of an emulsifying agent to produce latex of the rubbery polymer, the particles in the dispersed phase of the latex containing the intimate admixture of the suspension of carbon black and the rubbery polymer solution, and evaporating organic solvent from the latex to produce particles in the dispersed phase containing carbon black dispersed in the rubbery polymer.

7. The method of claim 6 wherein the rubbery polymer is selected from the group consisting of natural rubber, polychloroprene, rubbery homopolymers of conjugated diolefins, rubbery copolymers of conjugated diolefins and monoethylenically unsaturated monomers, and mixtures thereof.

8. The reinforced foamed rubber article prepared by the method of claim 6.

9. In a method of preparing a foamed rubber article wherein a composition including latex of a rubbery polymer is foamed and the foam is formed into a desired article, gelled and cured, the improvement comprising foaming a composition including latex prepared by a method including passing pelletized carbon black into a fluid energy pulverizer for grinding pelletized carbon black, passing vapor of a volatile inert organic solvent which is under pressure into the fluid energy pulverizer as a grinding fluid, dry grinding the pelletized carbon black into the fluid energy pulverizer by means of vapor of the organic solvent as the grinding fluid to produce comminuted carbon black, withdrawing vapor of the organic solvent containing suspended comminuted carbon black from the fluid energy pulverizer, and intimately contacting the withdrawn solvent vapor suspension of comminuted carbon black with liquid volatile inert organic solvent to condense the solvent vapor and produce a suspension of comminuted carbon black in the liquid organic solvent, intimately admixing the suspension of carbon black with a solution of polymer, the polymer comprising a rubbery copolymer of styrene and butadiene and being dissolved in a volatile inert organic solvent, emulsifying in water in the presence of an emulsifying agent the intimate admixture containing the suspension of carbon black and the solution of polymer to produce latex of the polymer, the particles in the dispersed phase of the latex containing the intimate admixture of the suspension of carbon black and the polymer solution, and evaporating organic solvent from the latex to produce particles in the dispersed phase containing carbon black dispersed in the polymer.

10. In a method of preparing rubber film articles wherein latex is coagulated on the surface of a form to produce a rubber film, the improvement which comprises coagulating on the surface of the form to produce the rubber film a composition including latex prepared by a method including passing pelletized carbon black into a fluid energy pulverizer for grinding pelletized carbon black, passing vapor of a volatile inert organic solvent which is under pressure into the fluid energy pulverizer as a grinding fluid, dry grinding the pelletized carbon black in the fluid energy pulverizer by means of the vapor of the organic solvent as the grinding fluid to produce comminuted carbon black, withdrawing vapor of the organic solvent containing suspended comminuted carbon black from the fluid energy pulverizer, and intimately contacting the withdrawn solvent vapor suspension of comminuted carbon black with liquid volatile inert organic solvent to condense the solvent vapor and produce a suspension of comminuted carbon black in the liquid organic solvent, intimately admixing the suspension of carbon black with a solution of a rubbery polymer dissolved in a volatile inert organic solvent, emulsifying in water in the presence of an emulsifying agent the intimate admixture containing the suspension of carbon black and the solution of rubbery polymer to produce latex of the rubbery polymer, the particles in the dispersed phase of the latex containing the intimate admixture of the suspension of carbon black and the rubbery polymer solution, and evaporating organic solvent from the latex to produce particles in the dispersed phase containing carbon black dispersed in the rubbery polymer.

11. The method of claim 10 wherein the polymer is selected from the group consisting of natural rubber, polychloroprene, rubbery homopolymers of conjugated diolefins, rubbery copolymers of conjugated diolefins and monoethylenically unsaturated monomers, and mixtures thereof.

12. The reinforced rubber film articles prepared by the method of claim 11.

13. The method of claim 11 wherein the rubbery polymer comprises a copolymer of styrene and butadiene.

14. The method of claim 13 wherein the intimate admixture to be emulsified contains rubbery polymer processing oil.

References Cited

UNITED STATES PATENTS

| | | | |
|---|---|---|---|
| 2,512,697 | 6/1950 | Te Grotenhuis | 260—2.5 |
| 2,940,960 | 6/1960 | Tegge et al. | 260—29.7 |
| 3,244,660 | 4/1966 | Herold | 260—29.7 |

MURRAY TILLMAN, *Primary Examiner.*

J. C. BLEUTGE, *Assistant Examiner.*